(12) United States Patent
Malik et al.

(10) Patent No.: US 7,487,479 B1
(45) Date of Patent: Feb. 3, 2009

(54) SYSTEMATIC APPROACH FOR APPLYING RECOMMENDED RULES ON A CIRCUIT LAYOUT

(75) Inventors: Shobhit Malik, Sunnyvale, CA (US); Hsiu-Nien Chen, San Jose, CA (US); Bob Yu, Fremont, CA (US); Wai Kit Leong, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 279 days.

(21) Appl. No.: 11/482,355

(22) Filed: Jul. 6, 2006

(51) Int. Cl.
*G06F 17/50* (2006.01)
(52) U.S. Cl. .............................................. 716/5; 716/1
(58) Field of Classification Search ...................... 716/1, 716/8, 11, 5
See application file for complete search history.

(56) References Cited

U.S. PATENT DOCUMENTS

| 5,197,116 | A | * | 3/1993 | Katoh et al. | 706/48 |
| 5,689,433 | A | * | 11/1997 | Edwards | 716/2 |
| 7,076,746 | B2 | * | 7/2006 | Hamlin et al. | 716/3 |
| 7,124,382 | B1 | * | 10/2006 | Eccles et al. | 716/5 |
| 2003/0101430 | A1 | * | 5/2003 | Liebmann et al. | 716/19 |
| 2003/0200524 | A1 | * | 10/2003 | Liebmann et al. | 716/19 |
| 2005/0273733 | A1 | * | 12/2005 | Lippincott | 716/4 |
| 2006/0066339 | A1 | * | 3/2006 | Rajski et al. | 324/765 |
| 2006/0206847 | A1 | * | 9/2006 | Ogawa | 716/9 |
| 2006/0218516 | A1 | * | 9/2006 | McLain et al. | 716/10 |
| 2006/0277512 | A1 | * | 12/2006 | Kucukcakar et al. | 716/6 |
| 2007/0198961 | A1 | * | 8/2007 | Allen et al. | 716/11 |

\* cited by examiner

*Primary Examiner*—Paul Dinh
*Assistant Examiner*—Suchin Parihar
(74) *Attorney, Agent, or Firm*—Hickman Palermo Truong & Becker LLP (57) ABSTRACT

A method and apparatus for enforcing design for manufacturability rules on a circuit layout is provided. A tool receives a first set of design rules, to be applied to the circuit layout, which must be followed. The tool also receives a second set of design rules, to be to the circuit layout, which may be followed. The first set of design rules may be supplied by an employer or followed by a design team, and the second set of design rules may correspond to a set of design for manufacturability (DFM) rules. The tool applies the first set of design rules and the second set of design rules to the circuit layout to generate a revised circuit layout. The revised circuit layout conforms to each of the first set of design rules, and conforms to as many design rules in the second set of design rules as possible.

27 Claims, 7 Drawing Sheets

SYSTEMATIC APPROACH FOR APPLYING RECOMMENDED RULES ON A CIRCUIT LAYOUT

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Design for Manufacturability (DFM) is an approach for optimizing the design of a product to increase the likelihood that the product may be manufactured without any errors or defects. For example, the design of a product may be adjusted by applying DFM considerations to provide certain margins of error in the design so that if an error does occur during the manufacturing process, the product is still operable.

A trend in circuit design is to design each subsequent generation of a circuit to have smaller dimensions than the prior generation. As the dimensions of a circuit layout become smaller, DFM considerations become more important, as the likelihood of an error or defect being introduced in the manufacturing process increases.

Today, a circuit designer is responsible for implementing DFM considerations in the design of a circuit to account for the practical limitations of the manufacturing process. Typically, a circuit designer follows a set of design rules (the "mandatory design rules") when designing a circuit layout. For example, the mandatory design rules may be provided by the circuit designer's employer or design team.

In addition to following the mandatory design rules, a designer is free to implement any DFM considerations on a circuit layout in any manner he or she chooses. As a result, different people may choose to apply DFM rules against a circuit layout in different ways. Thus, if the decision to apply DFM rules to a circuit layout is left to the individual circuit designer, DFM rules may be applied inconsistently across circuit layouts, which may result in (a) DFM rules being applied when they need not be applied and/or (b) DFM rules not being applied when they should be applied.

SUMMARY

Techniques are provided for consistently enforcing design for manufacturability (DFM) rules on a circuit layout. Advantageously, embodiments of the invention provide for a tool to enforce DFM rules on a circuit layout, rather than relying upon the circuit designer to enforce the DFM rules. In this way, the tool may apply DFM rules consistently across circuit layouts.

In an embodiment, a tool (hereinafter a "DFM tool") receives a first set of design rules, to be applied to a circuit layout, which must be followed. The first set of design rules may correspond to those design rules to which a circuit layout must conform, such as those supplied by an employer or those followed by a design team. The DFM tool also receives a second set of design rules, to be applied to the circuit layout, which may be followed. The second set of design rules may correspond to a set of DFM rules.

The DFM tool applies the first set of design rules and the second set of design rules to the circuit layout to generate a revised circuit layout. The revised circuit layout conforms to each of the first set of design rules, and conforms to as many design rules in the second set of design rules as possible. In this way, embodiments of the invention beneficially apply DFM rules consistently and systematically to a circuit layout, regardless of whether the circuit layout is directed to a lower-level design (such as a leaf cell) or to higher-level design (such as a circuit layout that comprises other lower-level circuit layouts).

BRIEF DESCRIPTION OF THE DRAWINGS

Embodiments of the invention described herein are illustrated by way of example, and not by way of limitation, in the figures of the accompanying drawings and in which like reference numerals refer to similar elements and in which.

DETAILED DESCRIPTION OF EMBODIMENT(S)

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

System Overview

Figure 1:
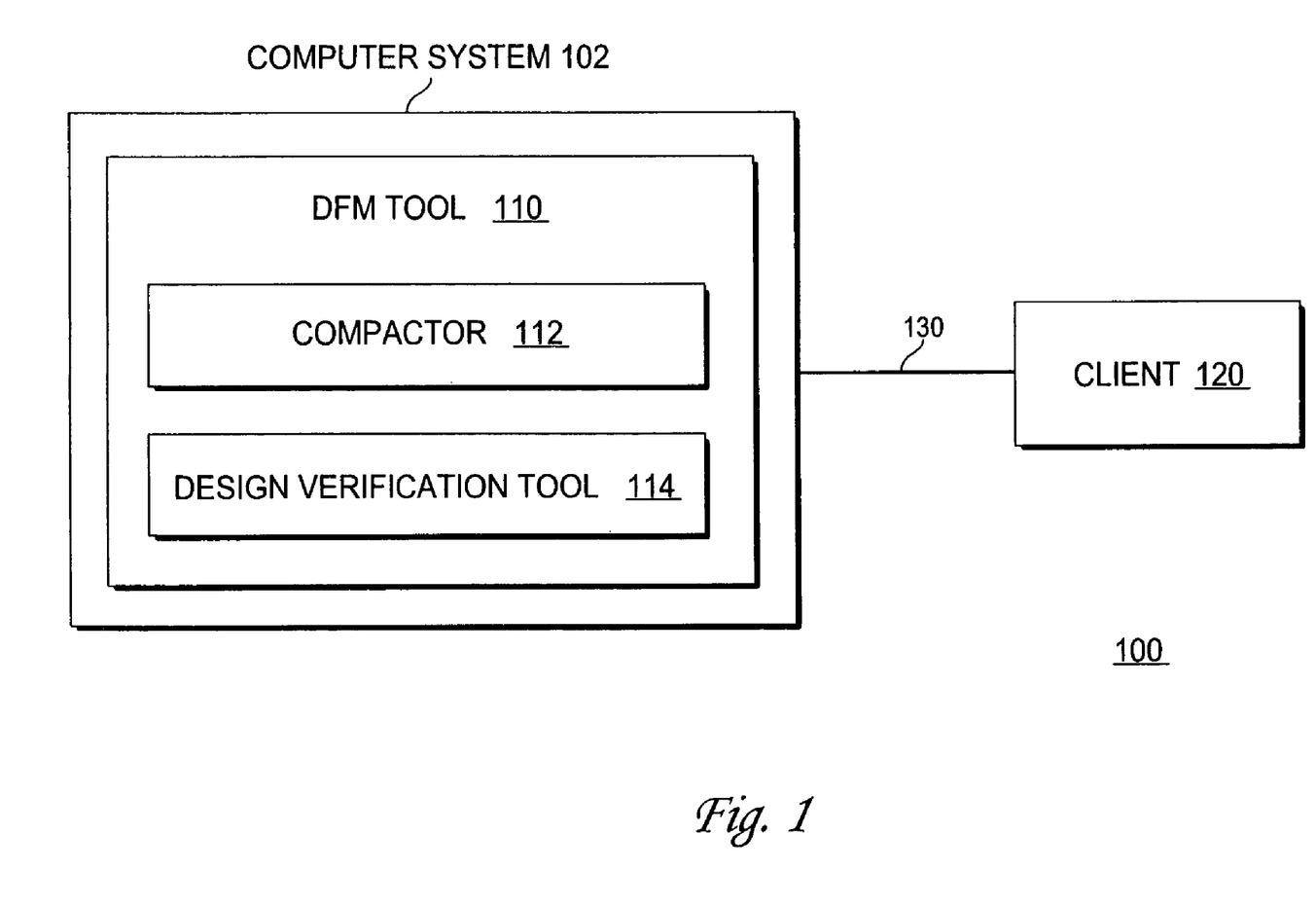
FIG. 1 is a block diagram of a system according to an embodiment of the invention.

Embodiments of the invention provide for a DFM tool to enforce DFM rules on a circuit layout. FIG. 1 is a block diagram of a system 100 according to an embodiment of the invention. In an embodiment, system 100 includes computer system 102, client 120, and communications link 130.

Computer system 102 includes DFM tool 110. A user may interact with DFM tool 110 through an interface, such as a display, input device, and/or a cursor control, provided by computer system 102. An exemplary computer system is described in further detail below.

DFM tool 110 may be implemented by any medium or mechanism that provides for applying a set of design rules to a circuit layout. For example, DFM tool 110 may correspond to a software component executing on computer system 102.

In an embodiment, DFM tool 110 may comprise one or more sub-tools, such as compactor tool 112 and design verification tool 114. DFM tool 110 may be configured to use one or more of compactor tool 112 and design verification tool 114 upon a particular circuit layout when applying a set of design rules to the circuit layout. Compactor 112 and design verification tool 114 each may be configured to apply design rules to a circuit layout. For example, embodiments of the invention may employ compactor 112 and/or design verification tool 114 to apply a set of mandatory design rules and/or a set of DFM design rules to a particular circuit layout.

Compactor tool 112 may be implemented by any medium or mechanism that provides for migrating a design of a particular circuit layout from a first set of dimensions to a second set of dimensions. To illustrate, a circuit layout is comprised of one or more polygons, and a polygon is a graphical depiction of a circuit design element in a circuit layout, such as a N gate, a shielding component, or another circuit layout (which is sometimes referred to as a "cell"). The minimum dimension of a polygon in a particular circuit layout may be 20 units. A compactor tool may be used to shrink the design of the particular circuit layout so that the minimum dimension of polygons in the particular circuit layout changes from 20 units to 10 units. A non-limiting, illustrative example of compactor tool 112 includes Virtuoso Layout Migrate, available from Cadence Design Systems, Inc. of San Jose, Calif.

Design verification tool 114 may be implemented by any medium or mechanism that provides for verifying a design of a particular circuit layout without moving or changing the shape of any of the polygons of the circuit layout. If, in verifying the design of a particular circuit layout, the design verification tool determines that the particular circuit layout does not conform to a particular design rule, the design verification tool does not modify the particular circuit layout, but instead, creates an overlay circuit layout. An overlay circuit layout is a circuit layout that is designed to be overlaid on top of the existing circuit layout. In this way, the design verification tool may add polygons to the overlay circuit layout so that when the overlay circuit layout is overlaid on top of the existing circuit layout, the resulting combination of the existing circuit layout and the overlay circuit layout conforms with the particular design rule. A non-limiting, illustrative example of design verification tool 114 includes one of the Calibre line of products, available from Mentor Graphics Corporation of Wilsonville, Oreg.

Compactor 112 and design verification tool 114 may each be used to create a revised circuit layout based on an existing circuit layout. Compactor 112 modifies an existing circuit layout to create the revised circuit layout. Thus, the revised circuit layout created by compactor 112 is the modified circuit layout. However, the revised circuit layout created by design verification tool 114 is the circuit layout resulting from overlaying the overlay circuit layout (created by design verification tool 114) with the existing circuit layout.

In an embodiment, compactor 112 primarily is responsible for moving and resizing a polygon, and design verification tool 114 is primarily responsible for adding redundancy to a circuit design by adding additional contacts or enlarging the dimensions of certain polygons to provide better connectivity.

In an embodiment, instead of interacting directly with computer system 102, a user may interact with DFM tool 110 through client 120. Client 120 may be implemented by any medium or mechanism that provides for interacting with DFM tool 110 over communications link 130. Examples of client 120 include, without limitation, a personal computer, a web browser, a software component, and a wireless device.

The presence of client 120 (and by extension communications link 130) is optional in system 100, as a user may interact directly with computer system 102 without the use of client 120. Also, while only one client 120 is depicted in system 100, system 100 may includes any number of clients 120, including two or more clients 120.

Communications links 130 may be implemented by any medium or mechanism that provides for the exchange of data between DFM tool 110 and client 120. Examples of communications link 130 include, without limitation, a network such as a Local Area Network (LAN), Wide Area Network (WAN), Ethernet or the Internet, or one or more terrestrial, satellite or wireless links.

Having described an exemplary system according to an embodiment of the invention, an illustration of how system 100 may be used shall now be discussed.

Functional Overview

DFM tool 110 may be used to apply a set of mandatory design rules and a set of DFM design rules to an original circuit layout to create a revised circuit layout. DFM tool 110 may store a set of mandatory design rules and/or a set of DFM design rules to be applied by DFM tool 110. Each mandatory design rule and each DFM design rule may specify a particular operation to perform on a circuit layout if a condition is satisfied. The particular operation to be performed if the condition is satisfied may be any operation, such as adding a polygon, removing a polygon, moving a polygon, or changing the shape of a polygon. For example, a particular design rule may specify that if a certain minimum distance does not exist between two polygons, then the polygons should be moved to ensure a particular minimum distance exists between the polygons.

Figure 2A:
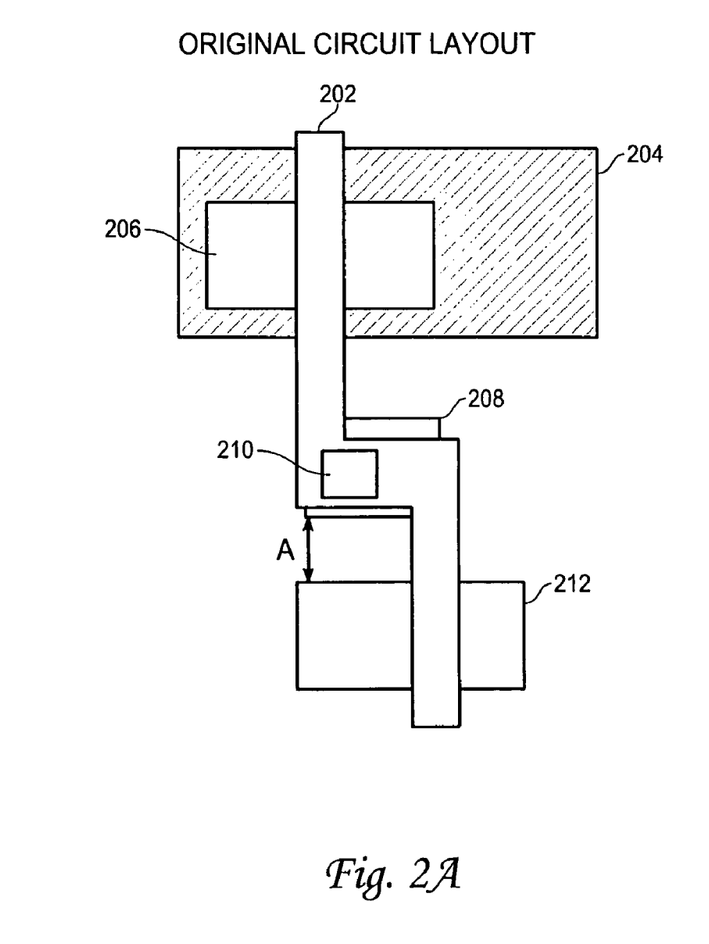
FIG. 2A is a graphical depiction of an original circuit layout according to an embodiment of the invention.

FIG. 2A is a graphical depiction of an original circuit layout according to an embodiment of the invention. The original circuit layout of FIG. 2A includes a variety of polygons, namely polygons 202-212.

Figure 2B:
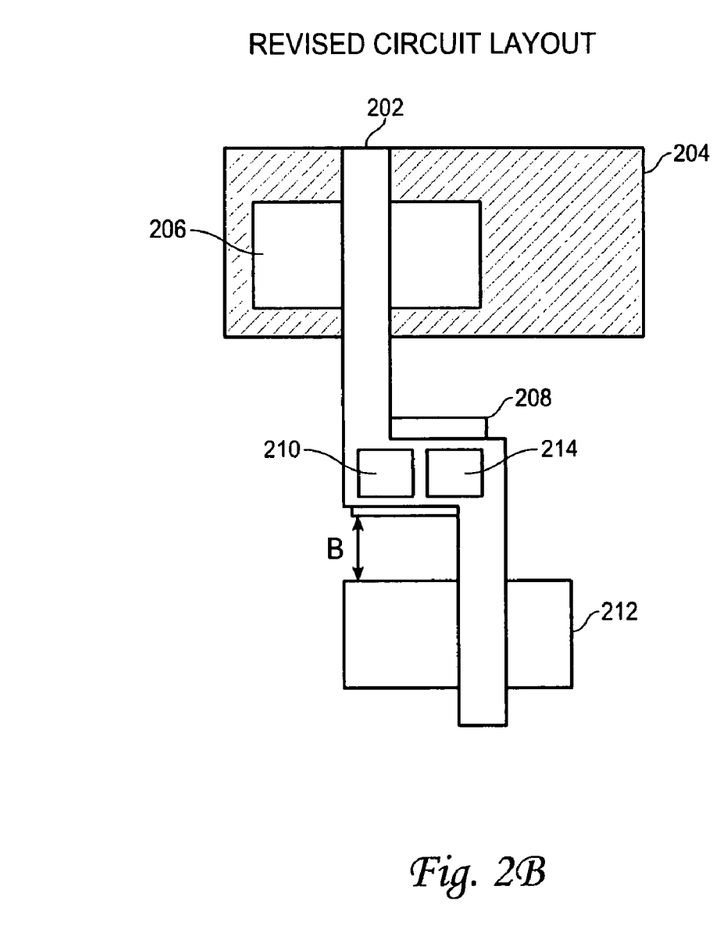
FIG. 2B is a graphical depiction of a revised circuit layout according to an embodiment of the invention.

DFM tool 110 may apply a set of mandatory design rules and a set of DFM design rules to the original circuit layout of FIG. 2A to create the revised circuit layout as depicted in FIG. 2B. As shown in the revised circuit layout of FIG. 2B, DFM tool 110 may move the location of a polygon, relative to other polygons, within a circuit layout without changing the shape of the polygon. For example, as shown in the different distance between polygons 208 and 212, the location of polygon 212 has been moved, relative to other polygons, from FIG. 2A to FIG. 2B, without changing the shape of polygon 212. DFM tool 110 may also change the shape of a polygon. For example, the shape of polygon 202 has been changed in FIG. 2B. DFM tool 110 may also be used to add or remove a polygon from a circuit layout. For example, polygon 214 has been added to the revised circuit layout of FIG. 2B.

In an embodiment, DFM tool 110 may store priority data that associates a priority with each DFM design rule stored by DFM tool 110. DFM tool 110 may initially apply the mandatory set of design rules to a circuit layout, and thereafter apply each of the DFM design rules, to the circuit layout, in order of priority. If the DFM tool 110 determines that a particular design rule to be applied to a circuit layout conflicts with another design rule that was previously applied to the circuit layout, DFM tool 110 determines that the particular design rule should not be applied to the circuit layout. In this way, once a design rule has been applied to a circuit layout, another design rule having a lower priority will not contradict a previously applied design rule.

Having provided a high-level functional overview of an embodiment, an explanation of the continuum of design levels of a circuit layout, and how the design level of a circuit layout may affect how DFM tool 110 may apply a design rule to the circuit layout, is provided below.

Levels of a Circuit Layout

As mentioned above, a polygon is a representation of a circuit design element, such as a circuit layout. As a polygon may correspond to a circuit layout, a circuit layout may be composed of other circuit layouts. In this way, certain circuit layouts may form the "building blocks" used in creating other circuit layouts. Such circuit layout may be referred to as "cells" by those in the art.

Figure 3:
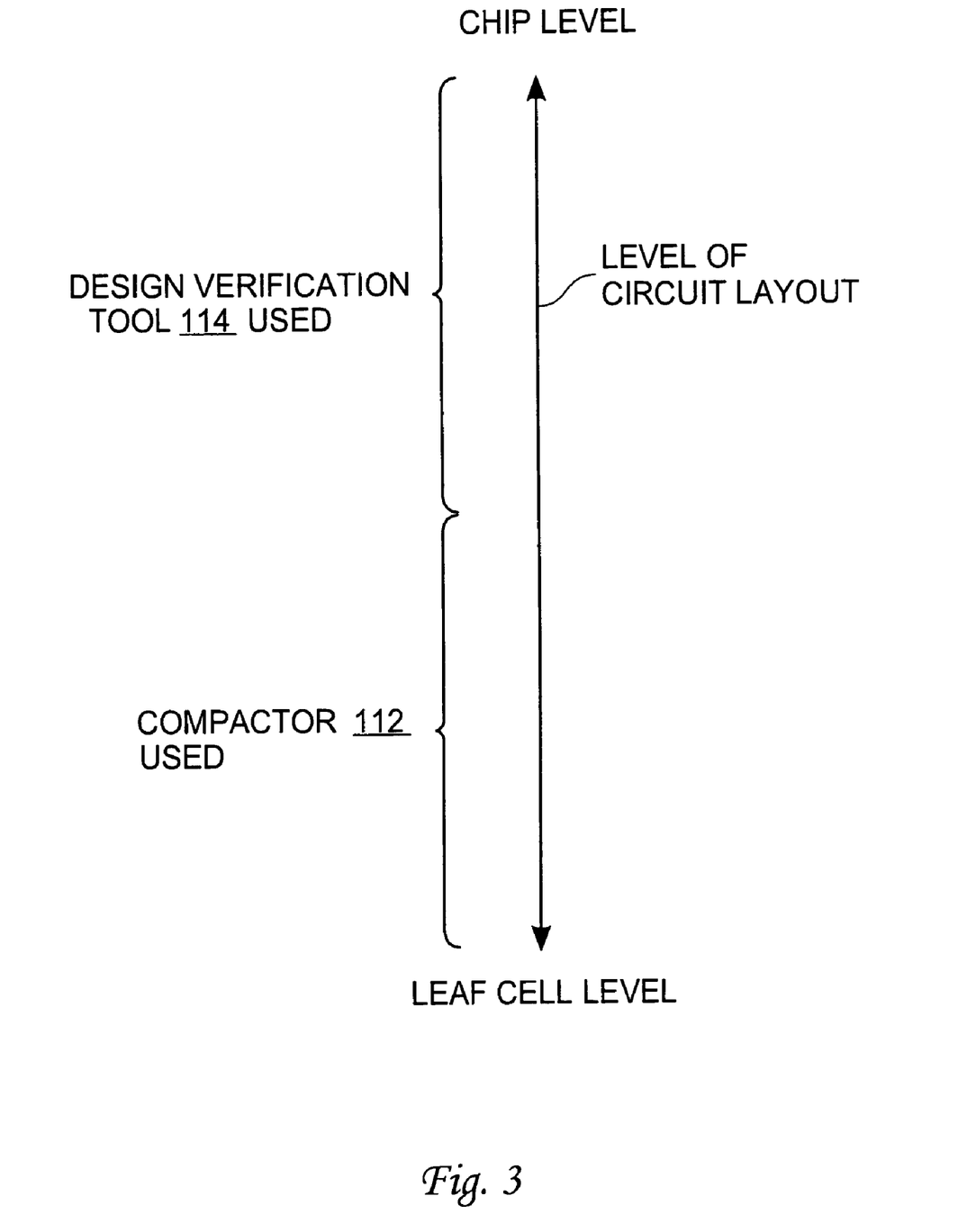
FIG. 3 is graphical depiction of a continuum of design levels that a circuit layout may have according to an embodiment.

To illustrate, consider FIG. 3, which is graphical depiction of a continuum of design levels that a circuit layout may have according to an embodiment. As shown in FIG. 3, the level of a circuit layout may correspond to a leaf cell level, a chip level, or any level in between. The leaf cell level refers to a circuit layout that does not itself comprise any other circuit layouts. For example, a memory cell may correspond to the leaf cell level if the memory cell does not comprise any other circuit layouts. On the other hand, the chip level refers to highest-level design of a microchip. Of course, a circuit layout may correspond to any level in between the leaf cell level and the chip level.

DFM tool 110 may use a different sub-tool in applying a design rule to a circuit layout depending on the level to which the circuit layout corresponds. It may be more efficient for DFM tool 110 to use compactor 112 to apply design rules to circuit layouts of a lower-level design, and to use design verification tool 114 to apply design rules to circuit layouts of a higher-level design. This is so because it is desirable to minimize the changes made to the shape of polygons in higher-level circuit layouts. Additionally, as the level of a circuit layout increases (i.e., the level moves closer to the chip level), the density of the polygons in the circuit layout typically decreases, thereby minimizing the likelihood that a conflict in a DFM design rule will require a polygon in the circuit layout to be moved or changed.

DFM tool 110 may use any criteria to determine whether a particular circuit layout corresponds to a lower-level design or a higher-level design. In an embodiment, DFM tool 110 may determine that a particular circuit layout is a lower-level circuit layout if the particular circuit layout comprises at least one transistor. In another embodiment, DFM tool 110 may determine that a particular circuit layout is a lower-level circuit layout if the number of polygons comprised in the circuit layout exceeds a configurable threshold.

Additionally, as the design of lower-level circuit layouts becomes finalized, it may not be desirable to change the design of a lower-level circuit layout, since a lower-level circuit layout may be incorporated in a variety of other circuit layouts. As a result, in an embodiment, the DFM tool 110 may determine that design verification tool 114, rather than compactor 112, should be used when applying design rules on a particular circuit layout if the number of other circuit layouts that incorporate the particular circuit layout exceeds a configurable number.

Enforcing DFM Rules on a Circuit Layout

Figure 4:
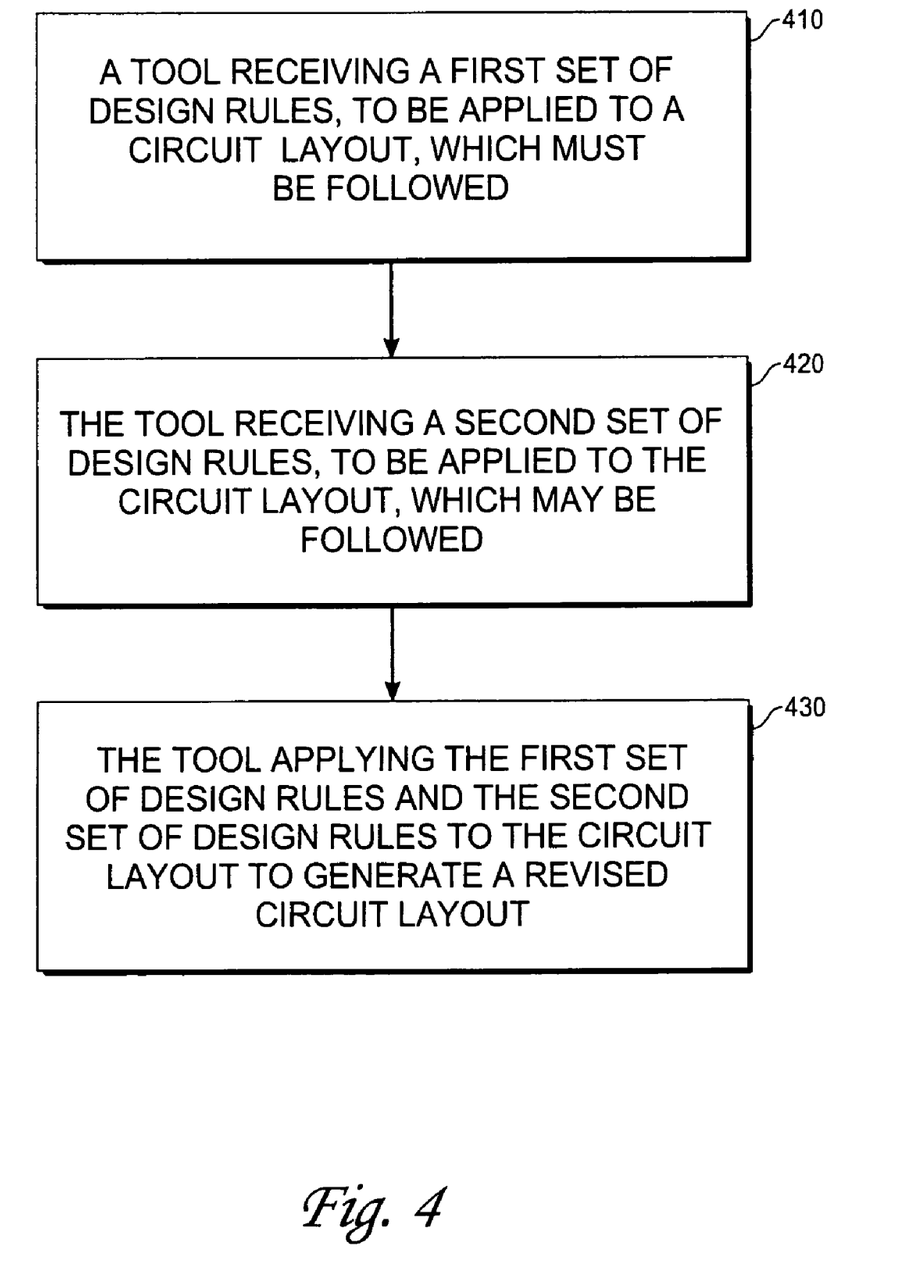
FIG. 4 is a flowchart illustrating the functional steps of enforcing design for manufacturability rules on a circuit layout according to an embodiment of the invention.

FIG. 4 is a flowchart illustrating the functional steps of enforcing design for manufacturability (DFM) rules on a circuit layout according to an embodiment of the invention. While FIG. 4 depicts a series of steps as occurring in a particular order, other embodiments of the invention may perform the steps of FIG. 4 in a different order, e.g., step 420 may be performed before, in parallel, or in the same act, as step 410. As a result, embodiments of the invention are not limited to the order of steps depicted in FIG. 4.

In step 410, DFM tool 110 receives a first set of design rules, to be applied to a circuit layout, which must be followed. For ease of explanation, the first set of design rules received in step 410 shall be referred to herein as the mandatory design rules. For example, a circuit designer's employer, design team, or fabricator of microcircuits may provide the circuit designer with the mandatory design rules which are to be followed, such as, e.g., rules regarding the minimum width of polygons, rules regarding the spacing of polygons, rules regarding the overlapping of polygons, and/or rules regarding the area a polygon may occupy.

In an embodiment, DFM tool 110 may receive the mandatory design rules through an interface provided by DFM tool 110. For example, the mandatory design rules may be recorded in a file, and thereafter DFM tool 110 may read the file to receive the mandatory design rules. Once DFM tool 110 receives the mandatory design rules in step 410, either compactor 112 or design verification tool 114 may apply any of the mandatory design rules. After the performance of step 410, processing proceeds to step 420.

In step 420, DFM tool 110 receives a second set of design rules, to be applied to a circuit layout, which may be followed. For ease of explanation, the second set of design rules received in step 420 shall be referred to herein as the DFM design rules, as the second set of design rules are typically directed towards applying DFM considerations to a circuit layout.

Each of the DFM design rules received in step 420 may be associated with priority data. In an embodiment, if a particular DFM design rule does not identify any priority data, then DFM tool 110 may dynamically determine priority data for the DFM design rule once it is received. For example, DFM tool 110 may infer the priority data for a particular design rule based upon the relative position of the particular design rule to the other DFM design rules that are received in step 420.

As in step 410, DFM tool 110 may receive the DFM design rules through an interface provided by DFM tool 110, e.g., DFM tool 110 may read the DFM design rules from a file. Once DFM tool 110 receives the DFM design rules in step 420, either compactor 112 or design verification tool 114 may apply any of the DFM design rules. After the performance of step 420, processing proceeds to step 430.

In step 430, DFM tool 110 applies the mandatory rules and as many of the DFM rules as possible to a circuit layout to generate a revised circuit layout. In an embodiment, a user may use an interface provided by DFM tool 110 to identify to DFM tool 110 a particular circuit layout. For example, the user may identify the particular circuit layout to DFM tool 110 using a graphical user interface.

In an embodiment, once the circuit layout is identified to DFM tool 110, DFM tool 110 may determine whether the circuit layout is a lower-level circuit layout or a higher-level circuit layout. If DFM tool 110 determines that the circuit layout is a lower-level circuit layout, then DFM tool 110 may use compactor 112 in applying the mandatory design rules and as many of the DFM design rules as possible to the circuit layout. If DFM tool 110 determines that the circuit layout is a higher-level circuit layout, then DFM tool 110 may use design verification tool 114 in applying the mandatory design rules and as many of the DFM design rules as possible to the circuit layout.

Once DFM tool 110 determines whether to use compactor 112 or design verification tool 114 (the particular sub-tool used shall be referred to as "the selected sub-tool"), the selected sub-tool applies each of the mandatory design rules to the circuit layout. In an embodiment, the selected sub-tool applies a particular mandatory design rule to the circuit layout by: (a) determining if the condition identified by the particular mandatory design rule is satisfied by the circuit layout, and (b) if the condition identified by the particular mandatory design rule is satisfied by the circuit layout, then performing the operation(s) specified by the particular mandatory design rule on the circuit layout.

In an embodiment, once the selected sub-tool applies all of the mandatory design rules, the selected sub-tool applies the DFM design rules to the circuit layout in order of priority. In an embodiment, the selected sub-tool applies a particular DFM design rule to the circuit layout by: (a) determining if the condition identified by the particular DFM design rule is satisfied by the circuit layout, and (b) if the condition identified by the particular DFM design rule is satisfied by the circuit layout, then performing the operation(s) specified by the particular DFM design rule on the circuit layout.

If the selected sub-tool determines that a particular design rule to be applied to a circuit layout conflicts with another design rule that was previously applied to the circuit layout, the selected sub-tool determines that the particular design rule should not be applied to the circuit layout. In this way, the selected sub-tool applies as many of the DFM rules as possible to the circuit layout.

The process of applying an illustrative DFM design rule to a circuit layout, as would be performed during step 430, shall now be described.

Applying an Illustrative DFM Design Rule

Figure 5A:
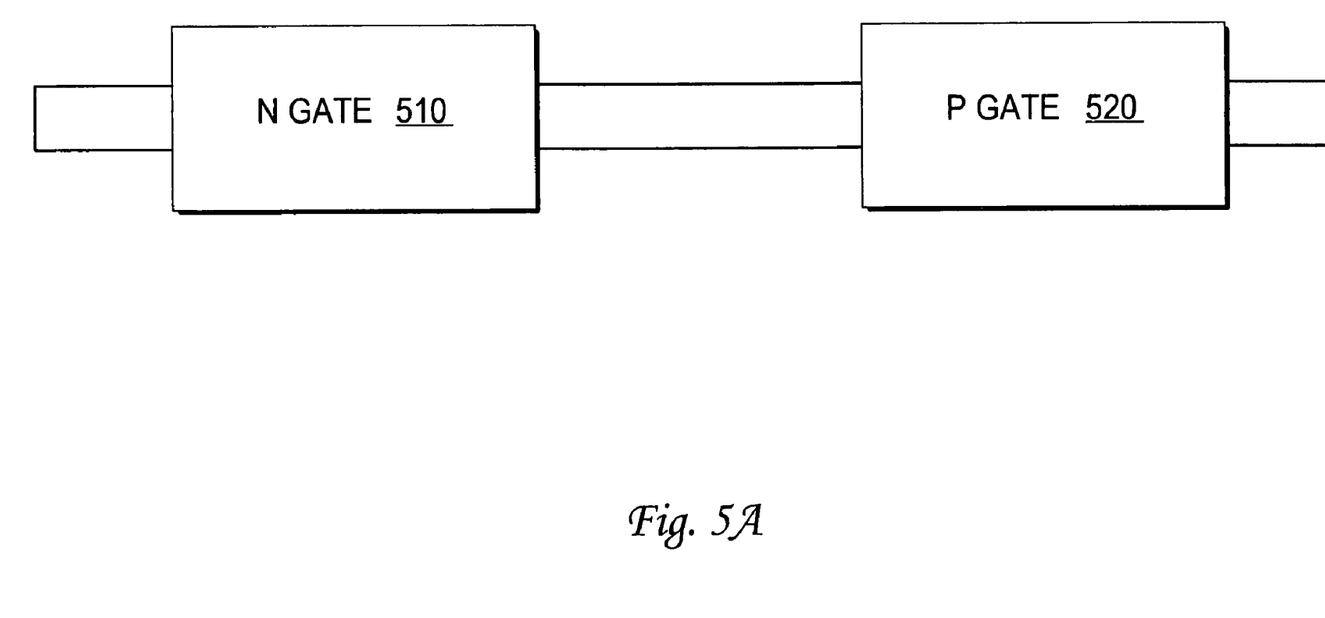
FIG. 5A is a graphical depiction of an original circuit layout according to an embodiment of the invention.

FIG. 5A is a graphical depiction of an original circuit layout according to an embodiment of the invention. The application of an illustrative DFM design rule to the original circuit layout of FIG. 5A shall be described below.

A DFM design rule may specify a particular operation to perform on a circuit layout if a condition is satisfied. For example, an illustrative DFM design rule may specify a condition that all N gates having a width smaller than 0.40 units and all P gates having a width smaller than 0.80 units are to be protected with a shielding polygon. A shielding polygon represents a circuit design element that acts a shield to help ensure the proper operation of another circuit design element. The operation specified by this illustrative DFM design rule may specify the addition of a shielding polygon to any unprotected portion of an N gate or a P gate that satisfies the condition.

Thus, if a sub-tool applied the illustrative DFM design rule above, the condition specified by the illustrative DFM design rule would not be met when a N gate or P gate is already shielded, the width of the N gate is greater than or equal to 0.40 units, or the width of the P gate is greater than or equal to 0.80 units.

Figure 5B:
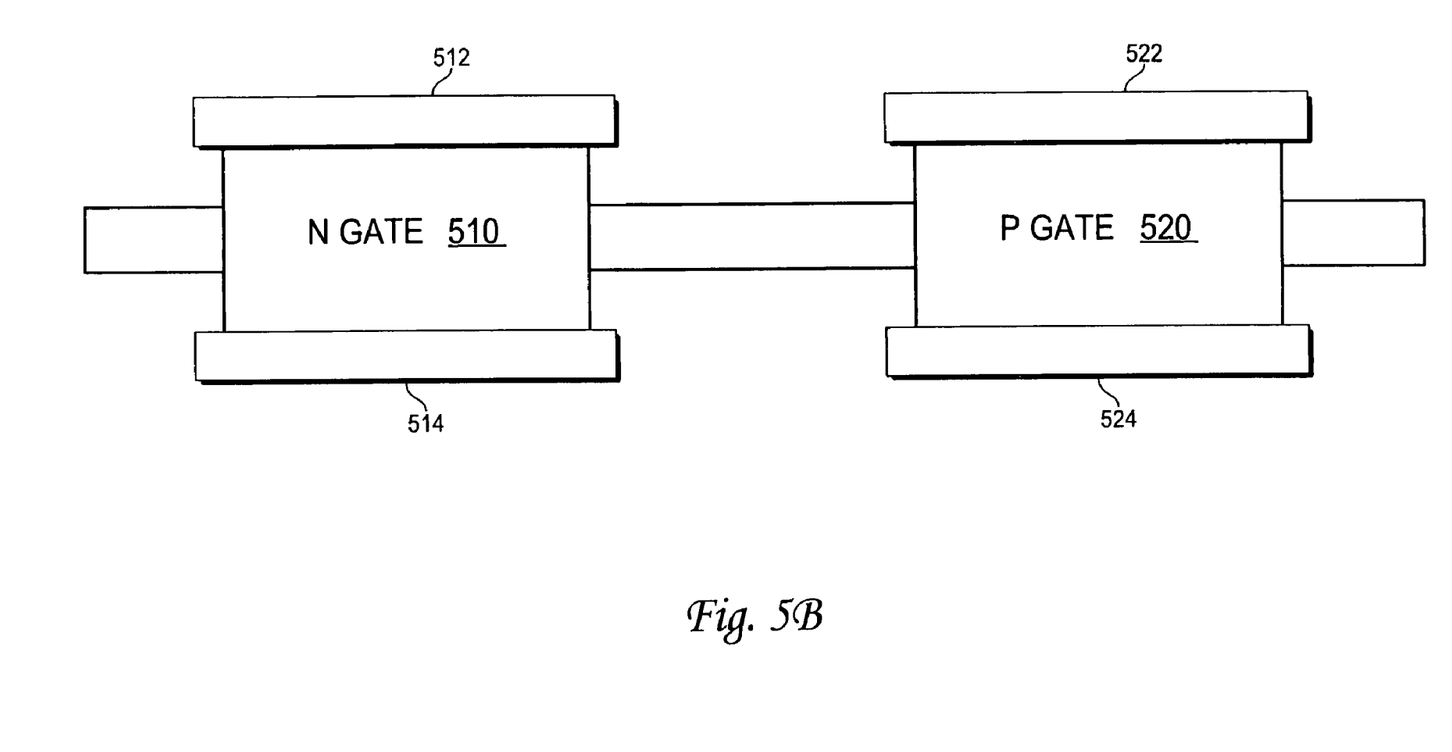
FIG. 5B is a graphical depiction of a revised circuit layout according to an embodiment of the invention.

Once the sub-tool identifies that the condition of a design rule is satisfied, the sub-tool performs the operation specified by the design rule. For example, assuming the N gate 510 and P Gate 520 of FIG. 5A each meet the condition specified for the illustrative DFM design rule, then the sub-tool will perform the operation specified by the illustrative DFM design rule to result in the creation of the revised circuit layout of FIG. 5B. As shown in FIG. 5B, shielding polygons 512 and 522 have been added to N gate 510, and shielding polygons 522 and 524 have been added to P gate 520.

The performance of this illustrative DFM design rule assumes that the operation specified by the illustrative DFM design rule does not conflict with any other design rule having a higher priority. If the sub-tool determines that, even though a condition specified by a particular design rule is satisfied, the operation specified by the particular design rule conflicts with another design rule having a higher priority, the sub-tool determines that the particular design rule should not be applied to the circuit layout.

Advantageously, embodiments of the invention provide for DFM tool 100 to enforce DFM rules on a circuit layout, rather than relying upon the individual circuit designer to enforce the DFM rules. In this way, DFM tool 100 may apply DFM rules consistently across circuit layouts, irrespective of whether the circuit layout is a lower-level circuit layout or a higher-level circuit layout.

Embodiments of the invention allow for DFM tool 100 to be used at all stages of a circuit design. For example, a circuit designer may use DFM tool 100 to apply DFM design rules to a leaf cell. DFM tool 100 will automatically use the proper sub-tool to analyze the leaf cell to create a revised circuit layout of the leaf cell that conforms to as many DFM design rules as possible.

After the design of the leaf cell has been finalized, the leaf cell may be incorporated into the design of another circuit layout ("the second circuit layout"). A circuit designer may use DFM tool 100 on the second circuit layout. DFM tool 100 will automatically use the proper sub-tool to analyze the second circuit layout to create a revised circuit layout of the second circuit layout that conforms to as many DFM design rules as possible.

After the design of the second circuit layout has been finalized, the second circuit layout may be incorporated into the design of another circuit layout ("the higher level circuit layout"). A circuit designer may use DFM tool 100 on the higher level circuit layout. In this way, a circuit designer may use DFM tool 100 on any level of the continuum of circuit levels depicted in FIG. 3, i.e., the circuit designer may use DFM tool 100 on any level of a circuit layout ranging from the leaf cell level up to and including the chip level. Advantageously, DFM tool 100 may be used to systematically apply DFM design rules across all levels of a circuit layout. Further, the DFM tool 100 may automatically use the appropriate sub-tool for the particular level of a circuit layout; thus, compactor 112 and design verification tool 114 may systematically be used in an overall design process to apply DFM design rules to all levels of a circuit layout, irrespective of how many circuit designers contributed to the design of any circuit layouts incorporated therein.

Implementing Mechanisms

Figure 6:
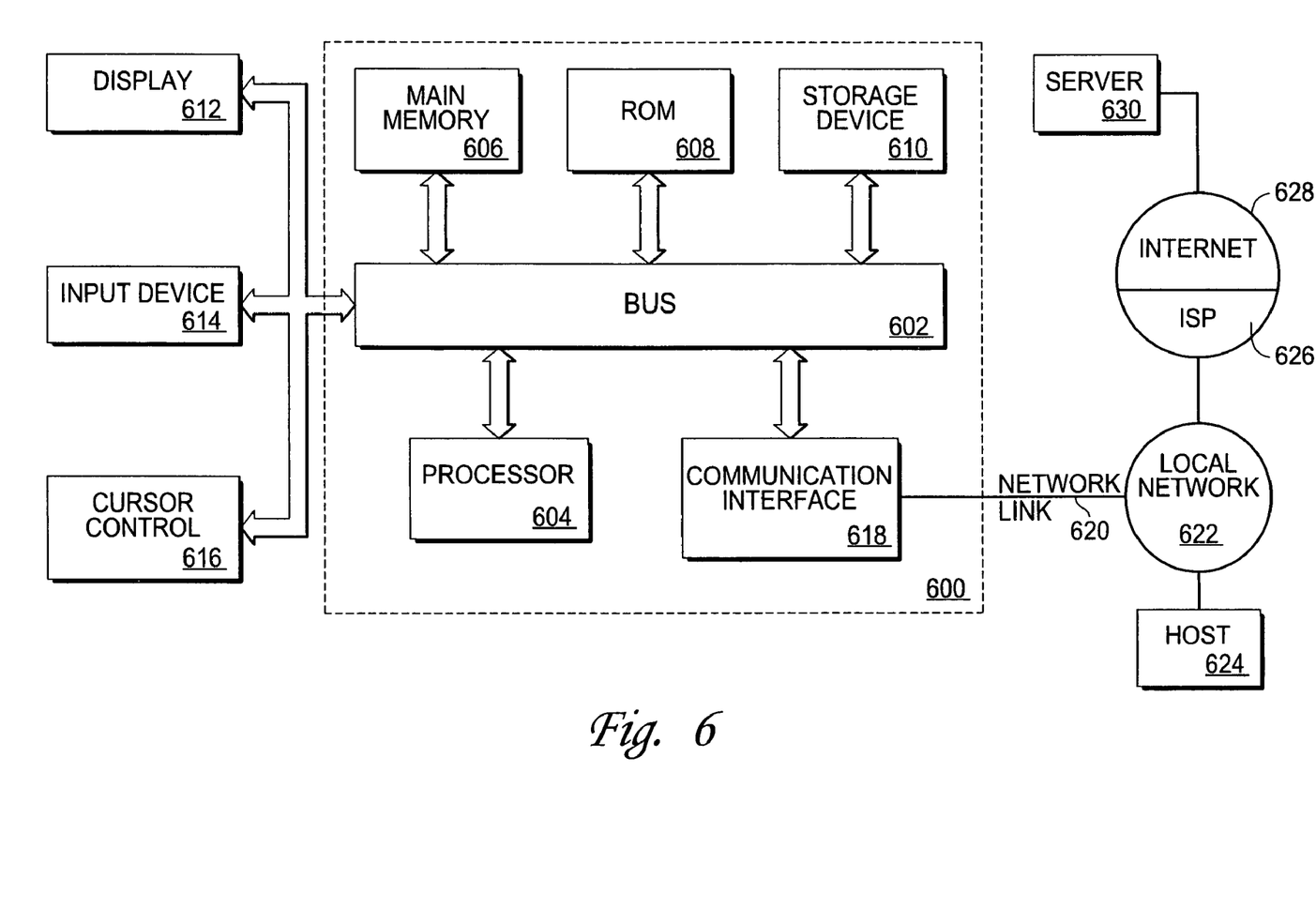
FIG. 6 is a block diagram that illustrates a computer system upon which a DFM tool according to an embodiment of the invention may be implemented.

FIG. 6 is a block diagram that illustrates a computer system 600 upon which an embodiment of the invention may be implemented. Computer system 600 may correspond to the computer system used to implement computer system 102 and/or client 102 of FIG. 1. Computer system 600 includes a bus 602 for facilitating information exchange, and one or more processors 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions by processor 604. Computer system 600 may further include a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

In computer system 600, bus 602 may be any mechanism and/or medium that enables information, signals, data, etc., to be exchanged between the various components. For example, bus 602 may be a set of conductors that carries electrical signals. Bus 602 may also be a wireless medium (e.g. air) that carries wireless signals between one or more of the components. Bus 602 may also be a medium (e.g. air) that enables signals to be capacitively exchanged between one or more of the components. Bus 602 may further be a network connection that connects one or more of the components. Overall, any mechanism and/or medium that enables information, signals, data, etc., to be exchanged between the various components may be used as bus 602.

Bus 602 may also be a combination of these mechanisms/media. For example, processor 604 may communicate with storage device 610 wirelessly. In such a case, the bus 602, from the standpoint of processor 604 and storage device 610, would be a wireless medium, such as air. Further, processor 604 may communicate with ROM 608 capacitively. In this instance, the bus 602 would be the medium (such as air) that enables this capacitive communication to take place. Further, processor 604 may communicate with main memory 606 via a network connection. In this case, the bus 602 would be the network connection. Further, processor 604 may communicate with display 612 via a set of conductors. In this instance, the bus 602 would be the set of conductors. Thus, depending upon how the various components communicate with each other, bus 602 may take on different forms. Bus 602, as shown in FIG. 6, functionally represents all of the mechanisms and/or media that enable information, signals, data, etc., to be exchanged between the various components.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for enforcing design for manufacturability rules on a circuit layout, comprising:

receiving, at a tool, a first set of design rules, to be applied to the circuit layout, which must be followed;

receiving, at the tool, a second set of design rules, to be applied to the circuit layout, which may be followed;

storing priority data that associates a priority with each of the second set of design rules; and the tool applying the first set of design rules and the second set of design rules to the circuit layout to generate a revised circuit layout which conforms to each of the first set of design rules and to as many design rules in the second set of design rules as possible, wherein applying comprises:

applying all of the first set of design rules to the circuit layout before applying any of the second set of design rules to the circuit layout;

applying the second set of design rules to the circuit layout in order of priority; and in response to determining that a particular design rule, in the second set of design rules, to be applied to the circuit layout conflicts with another design rule that was previously applied to the circuit layout, determining that the particular design rule should not be applied to the circuit layout.

2. The method of claim 1, wherein the circuit layout comprises one or more polygons, wherein each of the one or more polygons represents a circuit design element, and wherein the tool applying the first set of rules and the second set of rules comprises:

the tool moving at least one of the one or more polygons of the circuit layout from a first position to a second position.

3. The method of claim 1, wherein the circuit layout comprises one or more polygons, wherein each of the one or more polygons represents a circuit design element, and wherein the tool applying the first set of rules and the second set of rules comprises:

the tool changing the shape of at least one of the one or more polygons of the circuit layout from a first shape to a second shape.

4. The method of claim 1, wherein the tool comprises a compactor tool for migrating a design of a particular circuit layout from a first set of dimensions to a second set of dimensions.

5. The method of claim 1, wherein the tool comprises a design verification tool for verifying a design of a particular circuit layout without moving or changing the shape of any of one or more polygons of the circuit layout.

6. The method of claim 1, further comprising:

the tool determining whether the circuit layout comprises at least one transistor; and the tool determining whether to relocate or change the shape of any polygons of the circuit layout based on whether the circuit layout comprises at least one transistor.

7. The method of claim 1, further comprising:

the tool determining whether a number of polygons in the circuit layout exceeds a configurable threshold; and the tool determining whether to relocate or change the shape of any polygons of the circuit layout based on whether the number of polygons in the circuit layout exceeds the configurable threshold.

8. The method of claim 1, wherein the tool applying the first set of design rules and the second set of design rules comprises:

the tool generating the revised circuit layout by modifying the circuit layout to conform to each of the first set of rules and to conform to as many of the second set of rules as possible.

9. The method of claim 1, wherein the tool applying the first set of design rules and the second set of design rules comprises:

the tool determining what circuit design elements need to be added to the circuit layout;

the tool generating an overlay circuit layout that includes only the circuit design elements that need to be added to the circuit layout; and the tool generating the revised circuit layout by overlaying the overlay circuit layout with the circuit layout.

10. A machine-readable storage medium carrying one or more sequences of instructions which, when executed by one or more processors, cause the one or more processors to perform the operations of:

receiving, at a tool, a first set of design rules, to be applied to the circuit layout, which must be followed;

receiving, at the tool, a second set of design rules, to be applied to the circuit layout, which may be followed;

storing priority data that associates a priority with each of the second set of design rules; and the tool applying the first set of design rules and the second set of design rules to the circuit layout to generate a revised circuit layout which conforms to each of the first set of design rules and to as many design rules in the second set of design rules as possible, wherein applying comprises:

applying all of the first set of design rules to the circuit layout before applying any of the second set of design rules to the circuit layout;

applying the second set of design rules to the circuit layout in order of priority; and in response to determining that a particular design rule, in the second set of design rules, to be applied to the circuit layout conflicts with another design rule that was previously applied to the circuit layout, determining that the particular design rule should not be applied to the circuit layout.

11. The machine-readable storage medium of claim 10, wherein the circuit layout comprises one or more polygons, wherein each of the one or more polygons represents a circuit design element, and wherein the tool applying the first set of rules and the second set of rules comprises:

the tool moving at least one of the one or more polygons of the circuit layout from a first position to a second position.

12. The machine-readable storage medium of claim 10, wherein the circuit layout comprises one or more polygons, wherein each of the one or more polygons represents a circuit design element, and wherein the tool applying the first set of rules and the second set of rules comprises:
the tool changing the shape of at least one of the one or more polygons of the circuit layout from a first shape to a second shape.

13. The machine-readable storage medium of claim 10, wherein the tool comprises a compactor tool for migrating a design of a particular circuit layout from a first set of dimensions to a second set of dimensions.

14. The machine-readable storage medium of claim 10, wherein the tool comprises a design verification tool for verifying a design of a particular circuit layout without moving or changing the shape of any of one or more polygons of the circuit layout.

15. The machine-readable storage medium of claim 10, wherein execution of the one or more sequences of instructions by the one or more processors further causes:
the tool determining whether the circuit layout comprises at least one transistor; and
the tool determining whether to relocate or change the shape of any polygons of the circuit layout based on whether the circuit layout comprises at least one transistor.

16. The machine-readable storage medium of claim 10, wherein execution of the one or more sequences of instructions by the one or more processors further causes:
the tool determining whether a number of polygons in the circuit layout exceeds a configurable threshold; and
the tool determining whether to relocate or change the shape of any polygons of the circuit layout based on whether the number of polygons in the circuit layout exceeds the configurable threshold.

17. The machine-readable storage medium of claim 10, wherein the tool applying the first set of design rules and the second set of design rules comprises:
the tool generating the revised circuit layout by modifying the circuit layout to conform to each of the first set of rules and to conform to as many of the second set of rules as possible.

18. The machine-readable storage medium of claim 10, wherein the tool applying the first set of design rules and the second set of design rules comprises:
the tool determining what circuit design elements need to be added to the circuit layout;
the tool generating an overlay circuit layout that includes only the circuit design elements that need to be added to the circuit layout; and
the tool generating the revised circuit layout by overlaying the overlay circuit layout with the circuit layout.

19. An apparatus for enforcing design for manufacturability rules on a circuit layout, comprising:
one or more processors; and
a machine-readable medium carrying one or more instructions which, when executed by the one or more processors, cause the one or more processors to perform the operations of:
receiving, at a tool, a first set of design rules, to be applied to the circuit layout, which must be followed;
receiving, at the tool, a second set of design rules, to be applied to the circuit layout, which may be followed;
storing priority data that associates a priority with each of the second set of design rules; and
the tool applying the first set of design rules and the second set of design rules to the circuit layout to generate a revised circuit layout which conforms to each of the first set of design rules, and to as many design rules in the second set of design rules as possible, wherein applying comprises:
applying all of the first set of design rules to the circuit layout before applying any of the second set of design rules to the circuit layout;
applying the second set of design rules to the circuit layout in order of priority; and
in response to determining that a particular design rule, in the second set of design rules, to be applied to the circuit layout conflicts with another design rule that was previously applied to the circuit layout, determining that the particular design rule should not be applied to the circuit layout.

20. The apparatus of claim 19, wherein the circuit layout comprises one or more polygons, wherein each of the one or more polygons represents a circuit design element, and wherein the tool applying the first set of rules and the second set of rules comprises:
the tool moving at least one of the one or more polygons of the circuit layout from a first position to a second position.

21. The apparatus of claim 19, wherein the circuit layout comprises one or more polygons, wherein each of the one or more polygons represents a circuit design element, and wherein the tool applying the first set of rules and the second set of rules comprises:
the tool changing the shape of at least one of the one or more polygons of the circuit layout from a first shape to a second shape.

22. The apparatus of claim 19, wherein the tool comprises a compactor tool for migrating a design of a particular circuit layout from a first set of dimensions to a second set of dimensions.

23. The apparatus of claim 19, wherein the tool comprises a design verification tool for verifying a design of a particular circuit layout without moving or changing the shape of any of one or more polygons of the circuit layout.

24. The apparatus of claim 19, wherein execution of the one or more instructions by the one or more processors further causes:
the tool determining whether the circuit layout comprises at least one transistor; and
the tool determining whether to relocate or change the shape of any polygons of the circuit layout based on whether the circuit layout comprises at least one transistor.

25. The apparatus of claim 19, wherein execution of the one or more instructions by the one or more processors further causes:
the tool determining whether a number of polygons in the circuit layout exceeds a configurable threshold; and
the tool determining whether to relocate or change the shape of any polygons of the circuit layout based on whether the number of polygons in the circuit layout exceeds the configurable threshold.

26. The apparatus of claim 19, wherein the tool applying the first set of design rules and the second set of design rules comprises:

the tool generating the revised circuit layout by modifying the circuit layout to conform to each of the first set of rules and to conform to as many of the second set of rules as possible.

27. The apparatus of claim 19, wherein the tool applying the first set of design rules and the second set of design rules comprises:

the tool determining what circuit design elements need to be added to the circuit layout;

the tool generating an overlay circuit layout that includes only the circuit design elements that need to be added to the circuit layout; and the tool generating the revised circuit layout by overlaying the overlay circuit layout with the circuit layout.

\* \* \* \* \*